United States Patent [19]
Bassett et al.

[11] 3,832,541
[45] Aug. 27, 1974

[54] LIGHT CONTROL DEVICE

[76] Inventors: Marion Geraldine Currie Bassett, Upper Canada College, Toronto 195, Ontario; Alfred Thorburn Orr, 59 Astley Ave., Toronto 287, Ontario, Canada

[22] Filed: Sept. 11, 1972

[21] Appl. No.: 287,850

[30] Foreign Application Priority Data
July 24, 1972  Canada.............................. 147758

[52] U.S. Cl................ 240/106 R, 161/3.5, 161/408
[51] Int. Cl.............................................. F21v 5/00
[58] Field of Search............ 240/106, 46.59, 78 LD; 161/2, 3.5, 408; 264/129, 131, 132, 136

[56] References Cited
UNITED STATES PATENTS

| | | | |
|---|---|---|---|
| 2,099,034 | 11/1937 | Ralph............... | 240/106 R |
| 2,398,624 | 4/1946 | Decker.............. | 240/78 LD X |
| 2,756,326 | 7/1956 | Franck.............. | 240/106 R X |
| 3,020,395 | 2/1962 | Peltz................ | 240/106 R |
| 3,222,515 | 12/1965 | Orr.................. | 161/2 X |
| 3,265,804 | 8/1966 | Berger et al........ | 240/106 R X |
| 3,265,887 | 8/1966 | Wince............... | 240/106 R |
| 3,351,409 | 11/1967 | McGuire............ | 240/46.59 X |
| 3,351,753 | 11/1967 | Berger.............. | 240/106 R |
| 3,451,876 | 6/1969 | Edelmann et al.... | 161/2 |
| 3,483,366 | 12/1969 | Wince............... | 240/106 R |
| 3,566,102 | 2/1971 | Choyke, Jr......... | 240/78 LD |
| 3,721,818 | 3/1973 | Stahlhut............ | 240/78 LD X |

Primary Examiner—Joseph F. Peters, Jr.
Attorney, Agent, or Firm—Otto John Munz

[57] ABSTRACT

A decorative light control panel for use in conjunction with a light source for simultaneous reduction of glare, masking of the light source and delivery of a light output of a uniform brightness, comprising a transparent sheet having a first surface to receive the incident light from a light source and a second surface opposite to said first surface to emit the light received; said first surface composed of a plurality of spaced light diffusing areas having means to diffuse light incident upon them from the said light source and a plurality of alternating clear light transmitting areas permitting the remaining portions of the incident light to pass through said transparent sheet unimpeded; the light diffusing and light transmitting areas of the said first surface being arranged in decorative patterns; said second surface provided with arrays of light refractive means; the two opposite said surfaces forming with said transparent sheet an integral unit.

The means to diffuse and the means to transmit directly, of the first surface preferably, but not necessarily, are arranged in symmetrical alternating configurations of parallel lines, dots and/or patterns.

The refractive means of the second surface preferably are arrays of lenses, prisms and their combinations and are not necessarily correlated in their patterns with the patterns of the areas of the first surface.

12 Claims, 5 Drawing Figures

LIGHT CONTROL DEVICE

CROSSREFERENCE TO RELATED APPLICATION

Priority of corresponding Canadian Patent application Ser. No. 147,758, filed July 24, 1972 is claimed under the Convention.

BACKGROUND OF THE INVENTION

1. Field of the Invention

A light control unit provided with geometrically defined interior means to direct and mask light emission adjacent the source of light and decorative outer areas.

2. Description of the Prior Art

Prior known lighting panels have comprised one or more prismatic arrays of constant or variable angular configuration on one or both surfaces of the panel. Lenticular matrixes have also been used instead of prisms.

1. Prismatic and lenticular panels are primarily designed to direct light from areas where the light is inefficiently utilized, (ie. in high viewing angles,) to utilize the light more efficiently on the task and thereby to control the degree of direct glare.

2. The design of the aforementioned panels is based on the control of light by refraction. A physical dictate of a prismatic or lenticular panel as described above is the brightness and reflected glare of the light emitted from such a panel and this is directly proportional to the projected area of the luminaire (a function of the viewing angle of the luminaire). When viewed from below, luminaires of highly concentrated luminous intensities, normally show non-uniform flashing or non-uniform brightness across the face of the lens. The geometry of the interior design of the luminaire is also a contributing factor, in many cases to an undesirable non-uniform brightness across the face of the lens. It can be said, generally, that one can minimize non-uniform brightness across the face of the lens, by moving the lens further away from the light source, however luminaire efficiencies are decreased thereby.

At locations directly beneath a luminaire the non-uniform lens brightness may be imaged on the working surface and thus will result in a condition of reflected glare which is undesirable. The control of reflected glare, and improvement of contrast of a task has, in one method, been accomplished by the internal geometry of the luminaire combined with control by means of a translucent medium of diffuser being disposed between the source and the viewer.

The above mentioned diffusing method is used to provide a uniform or near uniform appearance or lack of uneven brightness across the face of the shielding medium, mask the lamp image, improve on the reflected glare and/or veiling reflections and to increase the contrast of the task.

There are inherent disadvantages in both basic solutions enumerated above.

3. A method to control the emitted light from a luminaire to overcome both problems simultaneously, without unreasonable or undesired excessive losses of efficiency, has long been a need. A recently granted patent (U.S. Pat. No. 3,288,900 issued Nov. 29, 1966) has achieved a dual control solution using another principle, but has many shortcomings, predominately the excessive loss of efficiency of emergent light from the combined panel which achieves the aforementioned dual control solution. The limitation pertaining to a simultaneous solution of the problems of direct glare, indirect glare and/or veiling reflections has been the fact that two basic solutions had to be united to solve the problems of diffusion of the emitted light and the reduction of glare of said light without excessive loss of efficiency.

On one hand, in considering a refractor with a uniform lens array, the following features are pesent.

Light is emitted from a bare lamp and, dependent on the angle of incidence of this light on the light receiving side of the refractor, some light is absorbed and some is reflected. The higher the angle of incidence of the light, on the typically flat light entry side of the refractor, the higher the loss of luminaire efficiency due to losses caused by reflectance and interreflectance. There exists a geometrical relationship between positions of the source and the lens, at various angles of incidence across the prism array of the lens.

At large angles of incidence much of the light is reflected back into the luminaire, some is lost, some later emerges after one, two, three, or more reflections. At each reflection some of the light is absorbed, and luminaire efficiency is lost.

The light that is emitted is controlled in the desired areas of the lens by refraction, but the process as a whole is basically inefficient.

The closer the source is to the lens and the higher the intensity of the source the more difficult is the design problem of having a uniform brightness across the face of the lens, as geometrically, there is much more light incident on the lens at high angles. However, the closer the lens is to the source, generally the higher will be the overall efficiency of the downward component of the luminaire, as the down light from the source will pass through the lens efficiently yielding lamp image, and a non-uniform brightness will result across the face of the lens. In this case the overall efficiency of the luminaire will be high but the reflected losses will also be high, yielding lamp image, veiled reflections and high values of reflected glare depending on the position of the viewer. Brightness variation, veiled reflections and indirect glare are undesirable from an aethestic viewpoint. However high overall luminaire efficiencies are desirable.

It is known that by moving the lens further away from the source, assuming the same internal geometry of the luminaire, and working with the same light intensity as in the example above, that a designer can minimize the brightness variation across the face of the lens. He can therefore improve the reflected glare and veiling reflections due to the luminaire. However, it is also known that as one moves the lens further away from the source, generally, one loses some of the overall efficiency of the luminaire. Thus a designer is continually caught in the required compromise.

On the other hand, the control media or panel which gives complete diffusion of the light yields a uniform appearnace from all angles of view. Also the diffusion of light, in principle, creates large losses in the efficiency of emitted light.

In the third comparison, namely the combined panel aforementioned, the desired properties of controlling both direct glare and indirect glare are accomplished but the solution is achieved at very high loss in efficiency of the luminaire. Also the emitted light from the combined panel is characteristically dull and lacking in lively qualities.

Because of the design confines previously mentioned, a lens panel used to control a light of high intensity with the refractive principle, generally is non-uniform in brightness across the face of the lens panel and excessively high in brightness if the source is placed close to the lens panel for reasons of obtaining high luminaire efficiency.

A line drawn perpendicular from the centre of the lens panel is defined as the nadir. Prior art lens panels of a luminaire of high efficiency utilizing the refraction principle generally limit the brightness at angles less than 45° from the nadir but are appreciably less effective in eliminating brightness at angles greater than 45°, particularly those angles above 75° from the nadir.

In this connection it is found that the presence of a reflection of a bright bare lamp image at the working surface, results as reflected glare. It is thus desirable to achieve "hiding" of the bare source for aesthetic reasons and also to spread this same flux more uniformly over a larger area and thus reduce the brightness of the lens panel. It is also desirable to control the light at high angles to meet direct glare criteria. It is obviously not possible to perform both of these control features and achieve a high emitted light efficiency at the same time, so a compromise must be made.

Attempts have been made to diffuse light without undue loss in efficiency by laminating or casting a thin diffusing medium to the back or entry side of a panel, however the exit light is still of virtually uniform distribution or characterized by circular distribution curve.

Products have been marketed where the entry surface of a lenticular array has been acid etched or physically abraided or treated to develop a more uniform exit light of a panel with a prismatic array. However, the peaks and valleys created by the above-mentioned methods create a rough multi-planar surface that absorbs too high a percentage of light as the entry light is bounced from surface to surface and much of the total lumen output is absorbed or lost by interreflectance of this rough surfaced diffusion plane.

Latterly, a new novel solution to simultaneously control both direct glare and also indirect glare or reflected glare, has been granted a patent. This was achieved by the placing of a thin diffusing medium to the back or entry side of a panel, then providing an air separation between components of the combined panel and processing the front surface of the panel, or light exit surface, with a prismatic array. The following are the severe limitations of the two-part panel.

A. In production, each individual size of panels must consist of two separate pieces, one thin diffusing medium, and one a prismatic panel, cut to the exact same dimensions, and laminated, adhered, joined or bonded, on the edges, only.

B. The thin diffusing medium which totally covers the back surface or entry surface of the light, diffuses all the entry light, and hence decreases the luminous flux or efficiency of light, reaching the prismatic array.

C. Even a miniscule break or penetration of the peripheral bond of the two sheets, or indeed a porosity of the adhesive joining or bonding of the two sheets, will, in subsequent washing, allow entry of water, thus, destroying the necessary separation effect. Also, any similar break can allow the entry of dust, or dirt in solution, or if the break is sufficiently large, entry of dirt itself. This dirt or dust cannot be removed satisfactorily without destroying the peripheral bond of the panel followed by cleaning, and rejoining.

D. Excess amounts of material, i.e. two complete sheets, must be used to achieve the desired shielding, where field practice has formerly required only one sheet, for the two basic separate light control requirements.

E. In production, each size of the myriad sizes of lenses required for different lighting fixtures, require in the peripherally bonded two sheet solution, specific sizing, that is, they must be jigged or tooled separately.

SUMMARY OF THE INVENTION

The primary object of the invention is to provide a light control panel for a luminaire of an improved uniform brightness and appearance and devoid of the defects of the prior art, having a partially light transmitting and partially diffusing surface composed of clear light transmitting areas and light diffusing areas and having an exterior light emitting surface composed of light refractive elements.

Other objects and many of the advantages of the present invention will become apparent to those skilled in this art from the following description in conjunction with the appended drawings.

The present invention will now be described with reference to the accompany drawings in which.

DESCRIPTION OF THE PREFERRED EMBODIMENTS

Figure 1:
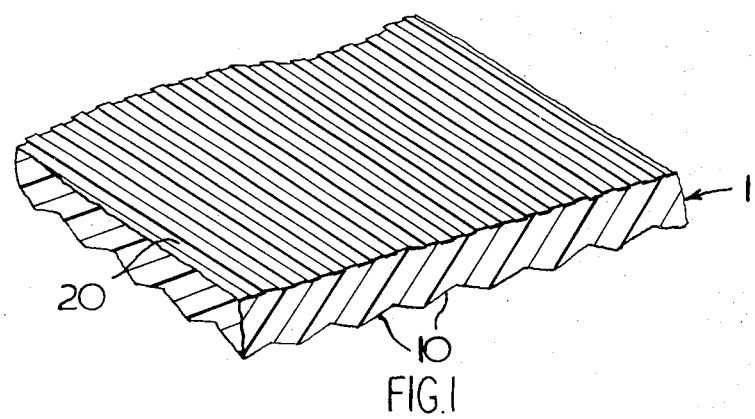
FIG. 1 is an oblique view of a section of a refractor panel having an upper surface embossed or decorated with alternating lines, one being a translucent diffusing line, the adjacent line being left clear or undecorated.
Figure 1A:
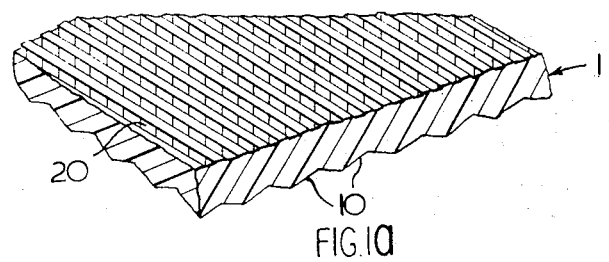
FIG. 1a is a detail of FIG. 1.

The panel shown in FIGS. 1 and 1a comprises a substantially transparent sheet, generally indicated at 1, having a lower surface formed into an array of prisms 10. The basic light control device may be formed from a variety of plastics materials such as transparent acrylic, polyolefins, cellulosics, nylons, styrenes, or any other transparent medium such as glass of different grades, shades, or hues.

Figure 3:
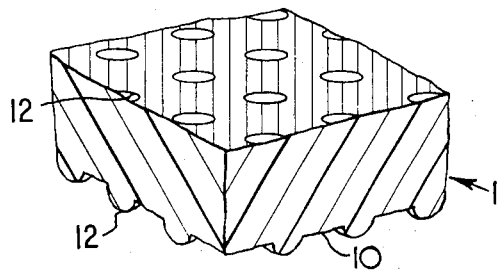
FIG. 3 is an enlarged detail view of a modification of the embodiments shown in FIGS. 1 and 2.

As shown in FIG. 3 a lenticular formation 12 may be used instead of a prismatic one. Further, the same lower surface may comprise both prismatic or lenticular formations.

Either or both of the formations may be spaced regularly or progressively varied to provide graded refraction. In FIG. 1, the upper surface 20 is embossed with equally spaced parallel lines of translucent material separated one from another by clear or undecorated areas of lens. Suitable materials for the lines comprise applied photographic emulsion, paint, scribed or etched lines, or said lines can be injected moulded, cut or etched into the lighting control device with translucent quality being imparted to said applied or induced lines.

These lines may be applied by rollers, stencils, screens, masks or photographic transfer, or physically induced into the light control device by machining, scribing, cutting, moulding, etc. It is to be understood that the lines may be unequally or non-linearly spaced in order to provide progressive changes in the diffusion through-out the surface of the light entry surface of the light control device.

Figure 2:
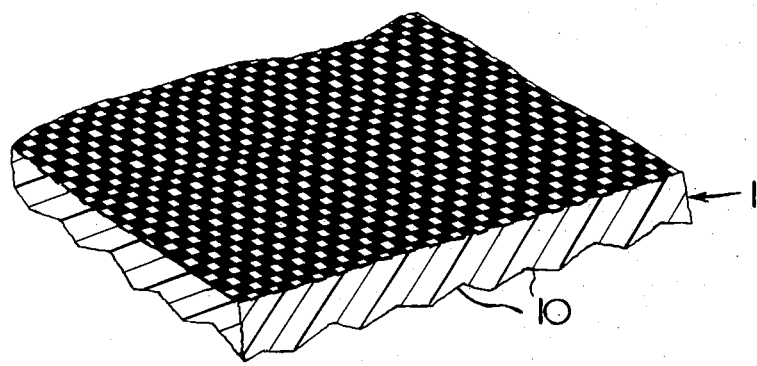
FIG. 2 is the same panel as in FIG. 1, but having a dot formation pattern thereon, being similarly composed of alternating areas of translucent diffusing material and areas of clear or undecorated light control device.
Figure 2A:
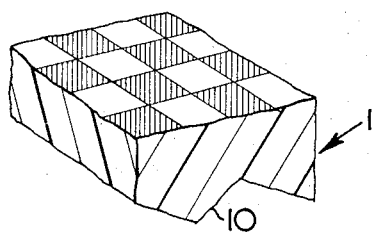
FIG. 2a is an enlarged detail of FIG. 2.

FIGS. 2 and 2a show a similar panel as in FIG. 1 wherein the upper surface 20 is treated with alternating clear and translucent dots. Again, the dots may be of even size and spacing but may also be non-regularly spaced or progressively changed to provide variable diffusion. In certain applications of the invention, it is contemplated that combinations of lines or dots may be used. This is shown in detail on FIG. 3. While the invention has been described with reference to the use of embossed or applied lines and/or dots, it is to be understood that geometrical or non-geometrical patterns may be used to give selected variations in the diffusion throughout the entry surface of the panel to accommodate the compromise between lamp to panel, and panel to work surface distance, and the desired amount of lamp masking.

The invention uses basic lighting principles in a new and novel manner to achieve the simultaneous control of direct glare and reflected glare. The invention provides the desired solution as only a portion of the entry light is diffused or blocked and the complementary portion of entry light can be utilized in total lens action. Therefore a uniform brightness, uniform flashing of the entry surface of the light is achieved and a higher amount of luminous flux is allowed to pass through the light control device in accordance with the invention. Thus the larger amount of penetrating luminous flux allows for an overall higher efficiency to the emergent light, than is the case when the total amount of entry light is diffused, prior to entering the prismatic array.

The resultant panel of the invention yields a better aesthetic appearance in that it masks lamp image and yet does not have the dull appearance typical on the two ply peripheral bonded lens. The quality of light emitted from this light control device is more lively or active, with resultant higher efficiency of the luminaire.

The resultant light control device of the invention is more suited to volume production methods and more flexible in that it does not require special tooling or jigging to manufacture each size. Techniques used to apply the grid pattern or alternating lines, dots or patterns to the light entry side of the panel, can be used on a wide variety of sizes, and types of prismatic arrays.

The resultant light control device of the invention can be first manufactured as a conventional extruded or molded prismatic plastic lens, or a glass lens, as it is equally applicable to all types of lens substrates, and thus off cuts can be reprocessed and reutilized. The pattern design application can be flexible in that one design master can be utilized for a large variety of lens sizes and patterns. The resultant light control device of the invention is thus much more flexible and less expensive to produce.

The invention solves the previously known problems which precluded the improvement of the quality of the emitted light without undue loss of efficiency and is also now simultaneously given directional control. Our invention solves the former common aforementioned problems of prior art panels.

1. The major problem or physical limitation in a panel which solely utilizes refraction as its control, when the panel is placed close to the source for reasons of luminaire efficiency, is that light, falling on a single prism from many directions and/or light from a point source, falls on various prisms at different angles of incidence. Thus a wide variation in the amount of light is exposed to different bands or areas of prisms and characteristically yields lines and shadow areas or non uniformity of light intensity to the viewer below. The light control device yields a more uniform brightness, when viewed from below, because pronounced variations in the across the lens brightness have been minimized by its partially diffusing element.

2. Where diffusion is the sole principle employed to control the light, characteristically the emitted light has been subjected to losses in efficiency due to absorption within the diffusing element, plus some first light entry surface losses due to reflection. Also, as characteristic in a diffusing panel, the emitted light is generally uniform in brightness at all angles, and although this is desirable from an appearance standpoint it does not necessarily control reflected glare and veiling reflections since it may produce undesired brightness at high angles yielding undesired high values of direct glare. The lighting control device which yields the advantages of improvement in values of reflected glare and veiling reflections also uses the partially refracting aspect of its design to control the undesired light at high angles, thus affording an improvement in the control of direct glare of the emitted light.

3. In comparison to the aforementioned latterly patented combined panel, the disclosed light control device has advantages. It is known that, if all light from the source is first totally diffused before being exposed to the interface and to the refractive component of the combined panel, the brightness is more uniform across the face of the entry side of the prism array, and therefore the emitted light is more controlled from the aspects of reflected glare and veiling reflections. There is, however, a pronounced reduction in overall luminaire efficiency due to the initial absorption losses in the diffusion process plus some losses of efficiency from reflection and interreflection at the light entry side of the combined panel. In light control devices there are also reflection losses at the light entry side of the device, but, due to the fact that the light control device is only partially diffusing and partially refracting, an emitted light of more uniform brightness, still exhibiting the desired requirement of having less indirect glare or veiling reflections results.

Further, the efficiency losses in the light control device are less than those of a combined panel because in the combined panel the entry light has been subjected to a total diffusion followed by the refraction process. In comparison, in this light control device the directional control of the emitted light is still maintained by the partially refractive aspect of the light control device and a higher portion of light passes through the light control device because of only partial diffusion.

4. In the light control device disclosed, the partially shielded, partially diffused light is subsequently handled by the prisms and the control of the distribution of the light is maintained. There are, of course, inherent losses due to the partial shielding and partial diffusion, but the gain in quality of the emitted light offsets the partial loss of efficiency.

The unique fact of our solution is that we have been able to achieve this simultaneous solution to both common problems, but have not done so by a total straight absorption or total physical damping of the light passing through the diffusing media into the lenticular array, but rather by the combined use of a scattering effect followed by prism control.

By control and selection of the pattern and/or design of the partially diffusing aspect of the light control device we have achieved a panel which partially diffuses and partially refracts by means of prism control to achieve the desired combined control function at reasonable cost.

We claim:

1. A light control device for use with a light source comprising:
   a panel of transparent material, said panel having:
   a first light incident surface incident to the said light source for receiving light from the said light source for partial transmission and partial diffusion thereof;
   a second light emitting surface overlapping said first surface for emitting refracted light;
   said first surface provided with alternating transmitting clear areas and light diffusing translucent areas;
   said second surface provided with light refractive formations.

2. A light control device as in claim 1 wherein said areas of said first surface define a grid.

3. A light control device as in claim 1 wherein a proportion of the said areas of said first surface are disposed in a non-linear relationship.

4. A light control device as claimed in claim 1, said light transmitting and light diffusing areas of said first surface including alternating clear and translucent areas.

5. A light control device as claimed in claim 1, said alternating clear and translucent areas including lines.

6. A light control device as claimed in claim 1, said alternating clear and translucent areas including dots.

7. A light control device as claimed in claim 1, said alternating clear and translucent areas including symmetrical geometrical patterns.

8. A light control device as claimed in claim 1, said light refractive formations including lenticular formations.

9. A light control device as claimed in claim 1, said light refractive formations including prismatic formations.

10. A light control device as claimed in claim 1, said light refractive formations including lenticular prismatic formations.

11. A light control device as claimed in claim 1, said formations of said second surface being arranged in symmetrical geometrical arrays of said formations.

12. A decorative light control panel for use in conjunction with a light source for simultaneous reduction of glare, masking of the light source and delivery of a light output of a uniform brightness, comprising:
    a transparent sheet having:
    a first surface to receive the incident light from a light source, and
    a second surface opposite to said first surface to emit the light received;
    said first surface composed of:
    a plurality of spaced light diffusing areas having means to diffuse light incident upon them from the said light source, and
    a plurality of alternating clear light transmitting areas permitting the remaining portions of the incident light to pass through said transparent sheet unimpeded;
    the light diffusing and light transmitting areas of the said first surface being arranged in decorative patterns;
    said second surface provided with arrays of light refractive means;
    the two opposite said surfaces forming with said transparent sheet an integral unit.

* * * * *